(12) United States Patent
Cyr et al.

(10) Patent No.: US 10,775,009 B2
(45) Date of Patent: Sep. 15, 2020

(54) SELF-DIAGNOSTIC FAULT IDENTIFICATION SYSTEM FOR EMERGENCY LIGHTING UNIT

(71) Applicant: Hubbell Incorporated, Shelton, CT (US)

(72) Inventors: Allen George Cyr, Greenville, SC (US); Jonathan Erik Bowers, Greenville, SC (US); Steven Dominic Fernandes, Spartanburg, SC (US); Robert Papstein, Greenville, SC (US)

(73) Assignee: Hubbell Incorporated, Shelton, CT (US)

( * ) Notice: Subject to any disclaimer, the term of this patent is extended or adjusted under 35 U.S.C. 154(b) by 118 days.

(21) Appl. No.: 15/664,458

(22) Filed: Jul. 31, 2017

(65) Prior Publication Data

US 2018/0073696 A1    Mar. 15, 2018

Related U.S. Application Data

(60) Provisional application No. 62/368,286, filed on Jul. 29, 2016.

(51) Int. Cl.

| | |
|---|---|
| *F21S 9/02* | (2006.01) |
| *H02J 7/00* | (2006.01) |
| *H05B 47/20* | (2020.01) |
| *H05B 47/29* | (2020.01) |
| *H02J 9/02* | (2006.01) |
| *H02J 9/06* | (2006.01) |
| *F21Y 115/10* | (2016.01) |
| *F21V 21/14* | (2006.01) |

(52) U.S. Cl.
CPC ............. *F21S 9/024* (2013.01); *H02J 7/0047* (2013.01); *H02J 9/02* (2013.01); *H02J 9/065* (2013.01); *H05B 47/20* (2020.01); *H05B 47/29* (2020.01); *F21V 21/14* (2013.01); *F21Y 2115/10* (2016.08)

(58) Field of Classification Search
None
See application file for complete search history.

(56) References Cited

U.S. PATENT DOCUMENTS

| | | | |
|---|---|---|---|
| 6,396,216 B1 | 5/2002 | Noone et al. | |
| 6,870,655 B1 | 3/2005 | Northam et al. | |
| 7,271,580 B1* | 9/2007 | Fenske | ................. G01R 31/021 |
| | | | 324/117 R |
| 7,573,396 B2 | 8/2009 | Stokes | |

(Continued)

OTHER PUBLICATIONS

PCT/US2017/044642 International Search Report and Written Opinion dated Nov. 22, 2017 (16 pages).

*Primary Examiner* — Matthew Mikels
(74) *Attorney, Agent, or Firm* — Michael Best & Friedrich, LLP

(57) ABSTRACT

An emergency lighting device includes a housing, a light emitter positioned in the housing, a control circuit positioned in the housing and operatively connected to the light emitter, an indicator light positioned in the housing, and a fault indicator circuit positioned in the housing and operatively connected to the indicator light. The fault indicator circuit is configured to monitor the light emitter, analyze activation of the light emitter, and activate the indicator light based on the analysis of the activation of the light emitter.

20 Claims, 7 Drawing Sheets

(56) References Cited

U.S. PATENT DOCUMENTS

| | | | |
|---|---|---|---|
| 2008/0211309 A1* | 9/2008 | Nolte | H02J 7/0045 307/66 |
| 2011/0260624 A1 | 10/2011 | Bigge et al. | |
| 2012/0221986 A1* | 8/2012 | Whitford | G06F 17/5004 716/100 |
| 2016/0216704 A1 | 7/2016 | Koh | |

* cited by examiner

US 10,775,009 B2

SELF-DIAGNOSTIC FAULT IDENTIFICATION SYSTEM FOR EMERGENCY LIGHTING UNIT

RELATED APPLICATIONS

The present application claims priority to U.S. Provisional Patent Application No. 62/368,286, filed on Jul. 29, 2016, the entire contents of which are hereby incorporated by reference.

FIELD

Embodiments relate to emergency lighting units, for example indoor emergency lighting units that can be mounted on a wall or ceiling.

BACKGROUND

Emergency units, such as exit signs and light fixtures, are commonly used in public buildings to indicate and illuminate areas such as stairs and exits in the event of a power failure. These fixtures typically have an emergency backup power system such as a battery that automatically turns on the emergency light when the primary power source is interrupted.

Once an emergency unit is installed, it must be serviced periodically to make sure it is functioning properly. Service issues can range, for example, from a simple battery replacement to the replacement of a complex, high-voltage circuit board. While some units have the ability to alert the user of an error or malfunction in the unit, determining the exact cause can be time consuming and expensive.

SUMMARY

According to an exemplary embodiment, an emergency lighting device including a housing, a light emitter positioned in the housing, a control circuit positioned in the housing and operatively connected to the light emitter, and a fault indicator circuit positioned in the housing and operatively connected to the control circuit. The device further includes a first indicator light connected to the fault indicator circuit, a second indicator light connected to the fault indicator circuit, and a third indicator light connected to the fault indicator circuit. Wherein the fault indicator circuit is configured to activate the first indicator light to indicate a plurality of faults, to activate the second indicator light to indicate a first fault, and to activate the third indicator light to indicate a second fault.

Another embodiment provides an emergency lighting device including a housing and a light emitter positioned in the housing. The device further includes a fault indication system positioned in the housing having a first indicator light, a second indicator light, a third indicator light, and a diffuser positioned over the first, second, and third indicator lights. The diffuser has a first symbol indicating a first fault and a second symbol indicating a second fault.

Another embodiment provides an emergency lighting device including a housing, a light emitter positioned in the housing, a control circuit positioned in the housing and operatively connected to the light emitter, an indicator light positioned in the housing, and a fault indicator circuit positioned in the housing and operatively connected to the indicator light. The fault indicator circuit is configured to monitor the light emitter, analyze activation of the light emitter, and activate the indicator light based on the analysis of the activation of the light emitter.

Another embodiment provides a method of controlling an emergency lighting device. The method includes monitoring, via a controller, one or more characteristics of the emergency lighting device, and activating a first indicator based on the one or more characteristics. The method further includes monitoring activation of the first indicator, analyzing the activation of the first indicator, and activating, based on the analysis of the activation of the first indicator, a second indicator.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Figure 1:
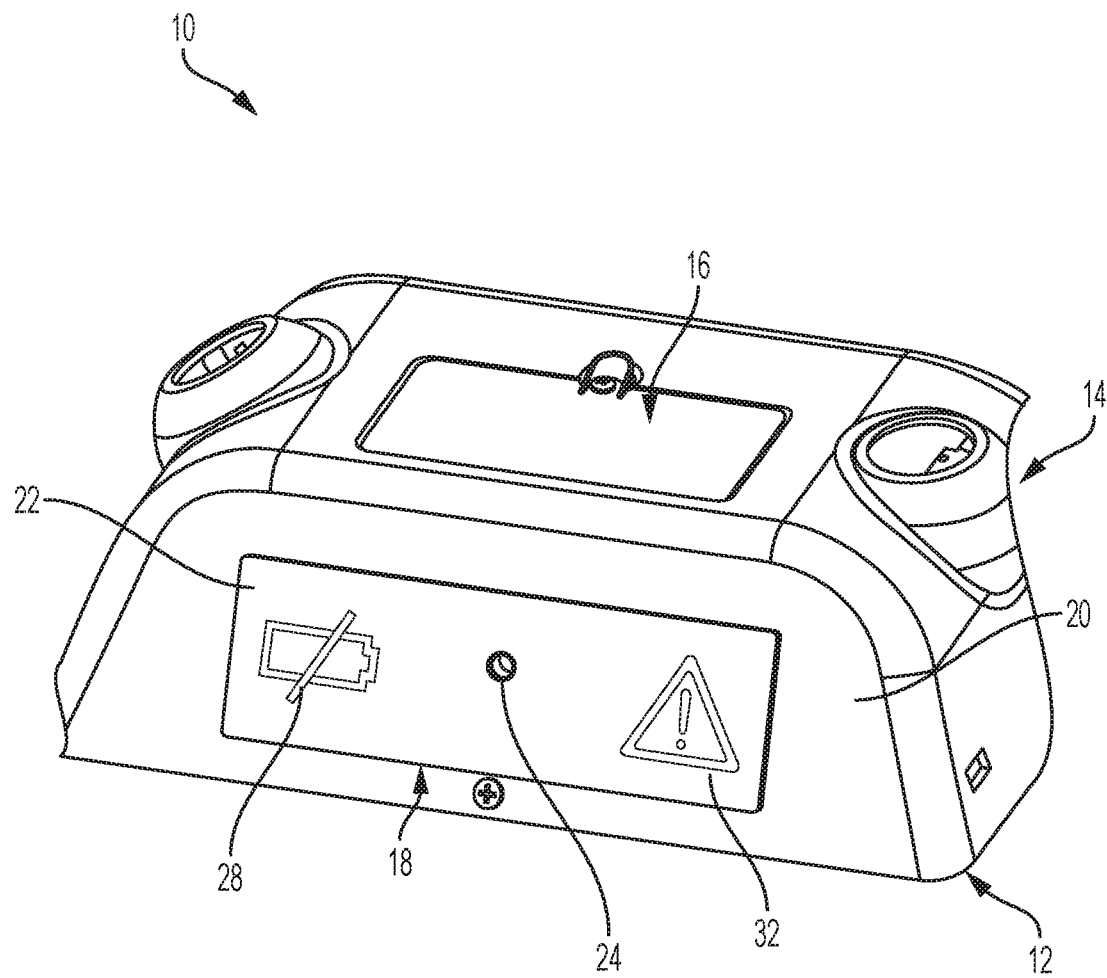
FIG. 1 is a bottom perspective view of an exemplary lighting unit and fault indication system.
Figure 2:
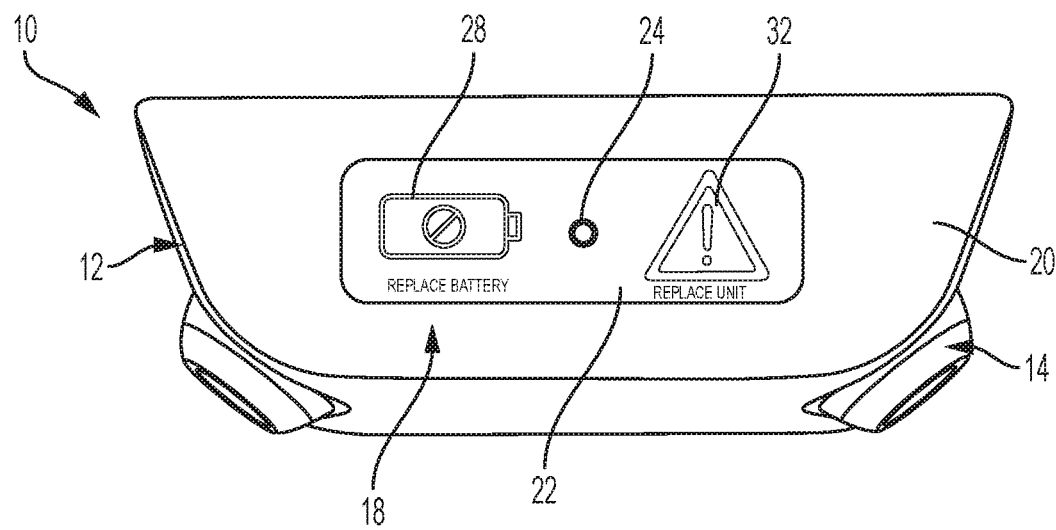
FIG. 2 is a bottom view of FIG. 1 showing the first indicator light activated.
Figure 3:
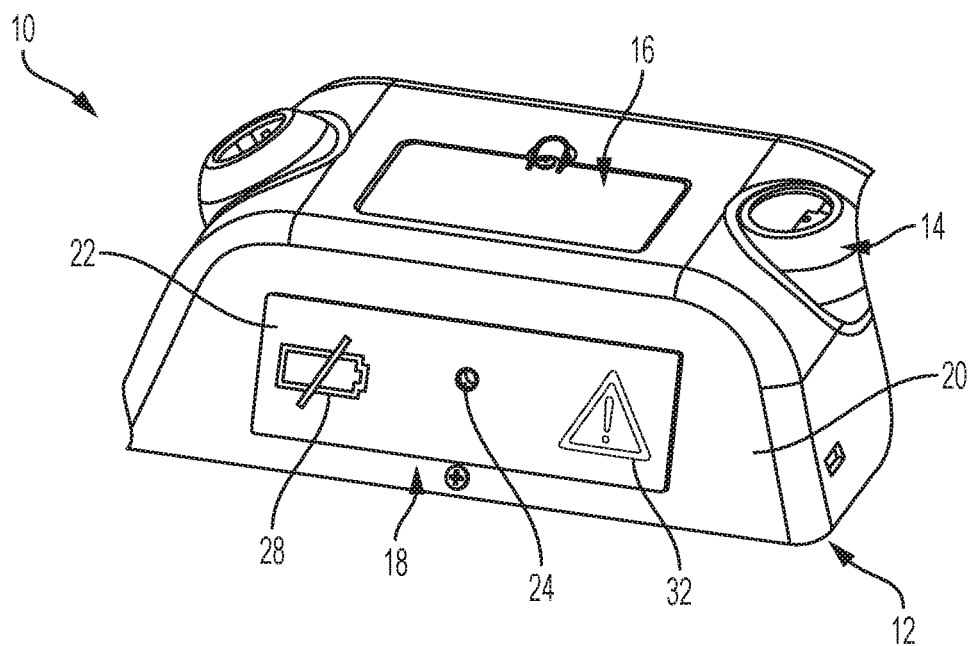
FIG. 3 is a bottom perspective view of the light unit showing the second indicator light activated.
Figure 4:
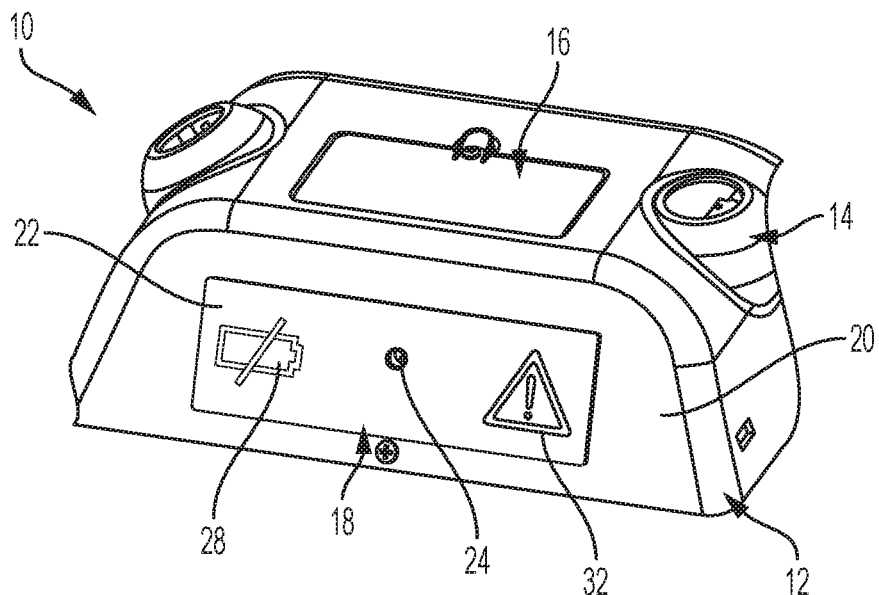
FIG. 4 is a bottom perspective view of the light unit showing the third indicator light activated.

Emergency signaling devices, such as emergency exit lights, can include a housing containing one or more light emitters, a backup battery, a charging and control assembly, and other electrical components. The charging and control assembly can include a control circuit configured to charge the backup battery and discharge the battery to power the lights when a main power supply is unavailable. The control circuit can also be configured to run a self-diagnostic or otherwise detect faults in one or more of the electrical components, for example the battery, driver, charger, etc.

A fault can be triggered from a low-voltage condition. For example, a battery voltage level can be compared to a one-minute test, a 30 minute test, a 60 minute test, and a 90 minute test. If the battery voltage is insufficient to pass the one-minute test, the battery voltage is sufficiently low that the battery could not power the emergency lighting unit 100 for one minute during the emergency mode. Similar comparisons are performed for the 30, 60, and 90 minute tests to assess how long the battery would be able to power the emergency lighting unit 100.

The self-test diagnostic fault conditions also include a battery disconnect fault (e.g., battery disconnected from emergency lighting unit), a battery fault (e.g., battery capacity or battery voltage too low), a charger fault (e.g., bulk charge voltage exceeds +/−10% of desired voltage for too great of a period [e.g., 15+ hours]), an LED driver fault (e.g., LED string voltage at or near zero volts), a lamp fault, and a load learn fault. Identifying the lamp fault includes enabling the driver module and monitoring an LED string voltage when operating normally. The LED string voltage is continuously monitored and, if the LED string voltage is outside of a desired voltage range (e.g., +/− one volt), the lamp fault is triggered. The load learn fault is related to the emergency lighting unit being unable to determine or learn a proper or normal load for the emergency lighting unit (e.g., LED string voltage).

When a self-test diagnostic fault condition is identified, a specific LED blinking pattern can be used to indicate the fault to a user. The fault light can be a bi-color LED light that blinks to signal a fault. The length and number of blinks are a code that can signal specific faults to a user. This system can have drawbacks. The codes can be confusing to determine and require a reference card that may not always be accessible. People who are color blind may also not be able to tell the difference in the LED colors.

Further details regarding emergency exit lighting devices are included in U.S. patent application Ser. Nos. 14/955,497 and 15/130,415 the disclosures of which are hereby incorporated by reference in their entirety.

According to various exemplary embodiments, an emergency signaling device includes an alternative fault signaling system having a simplified fault indication. In an exemplary embodiment, the fault signaling system has a first signal that indicates that a battery needs to be replaced and a second signal that indicates that the entire unit should be replaced.

FIGS. 1-4 show an exemplary embodiment of an emergency exit light device to that includes a housing 12 having a pair of light emitters 14, a battery compartment 16, and a fault indication system 18. The fault indication system 18 can be positioned on a bottom wall 20 of the housing, allowing a fault indication to be easily seen when the unit is placed on a wall or other support.

The fault indication system 18 includes a diffuser 22 and one or more (for example, three) indicator lights (i.e. LEDs) positioned behind the diffuser 22. The diffuser 22 may be a substantially flat plate having one or more transparent or semi-opaque sections with identifying symbols. The first indicator light 24 may be a bi-color LED that is capable of signaling to a user a wide range of default codes through a series of blinking lights (for example, red or green blinking lights). The second indicator light 26 may be a replace battery indicator that is positioned behind a replace battery symbol 28 of the diffuser 22. The third indicator light 30 may be a replace unit indicator positioned behind a replace unit symbol 32 of the diffuser 22.

Figure 5:
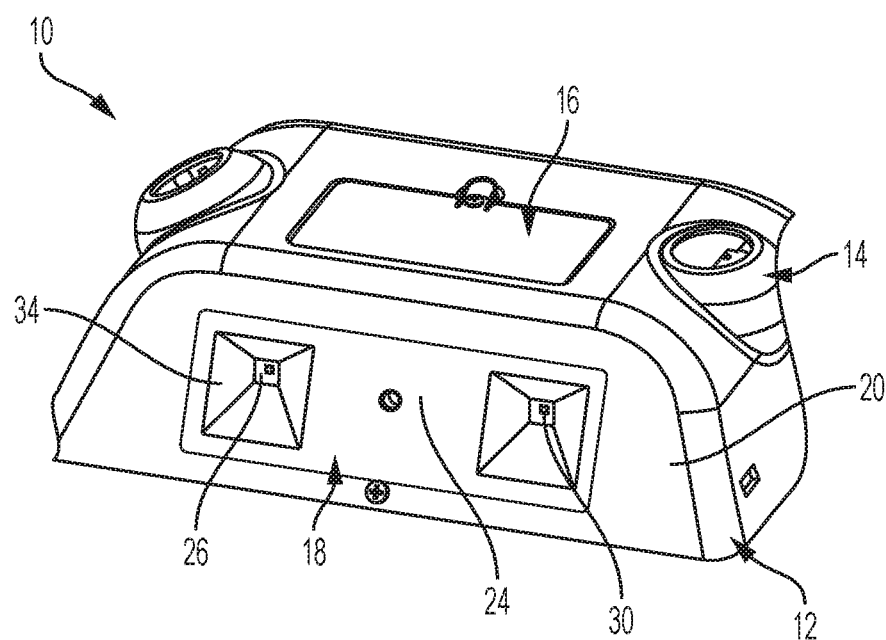
FIG. 5 is a bottom perspective view of the light unit with the diffuser plate removed.

FIG. 5, shows the diffuser 22 removed to expose the indicator LEDs 24, 26, 30. The LEDs may be white to eliminate any issues with color blindness, although different colors may also be used. The symbols may also be colored to impart color to the light through the diffuser 22. The housing 12 includes one or more tapered openings 34 around the second and third indicator LEDs 26, 30 to help direct the emitted light.

By utilizing the indicators, fault status is easily visible and understood by a user on the floor and users are not required to cross reference blink codes from a bi-color LED to a blink code description chart to determine the fault present on a unit after self-testing has occurred.

Figure 6:
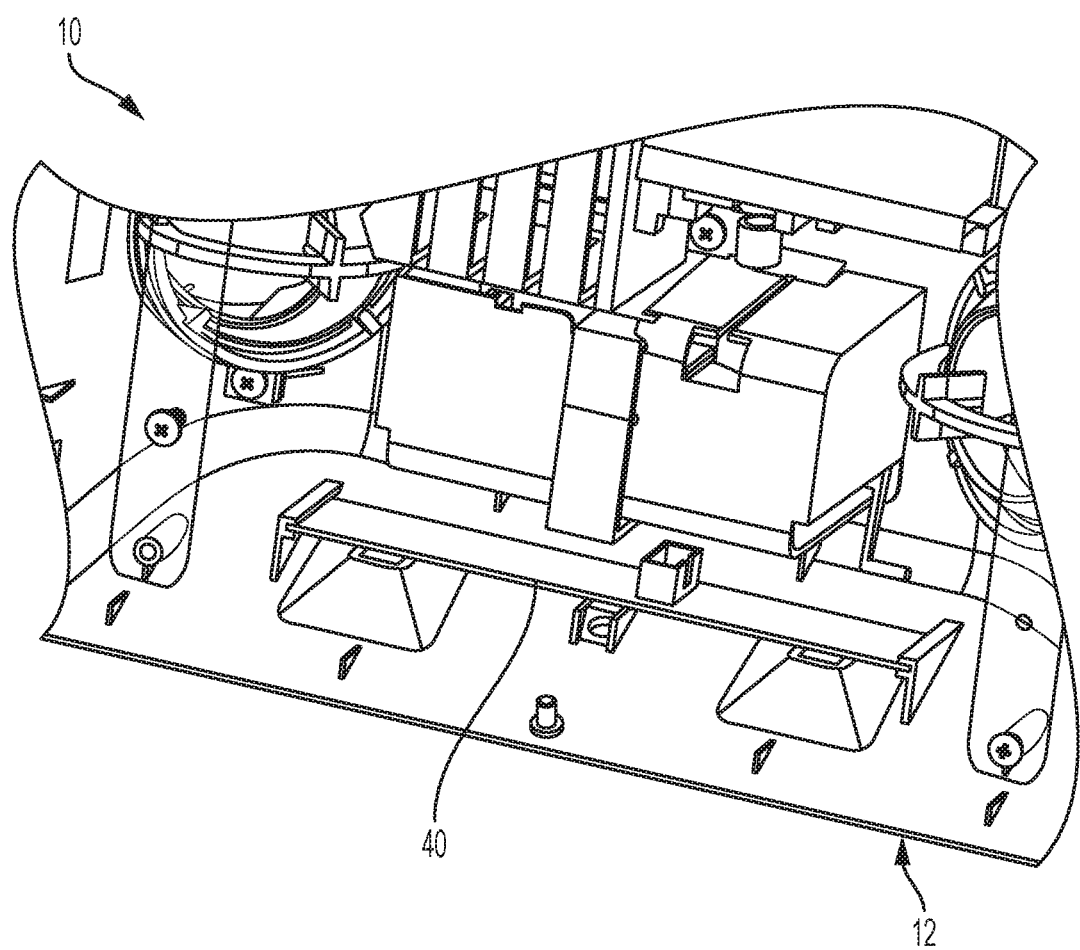
FIG. 6 is a rear perspective view showing the interior of the light unit.

FIG. 6 shows an interior of the housing 12. The indicator lights 24, 26, 30 may be connected to a fault indicator circuit board 40. The fault indicator circuit board 40 may be connected to a control circuit board (not shown). In an exemplary embodiment, the fault indicator circuit board 40 is capable of translating or interpreting faults from the control circuit board. The fault indicator circuit board 40 determines if the fault requires the replacement of the battery or replacing of the entire unit and activates the appropriate indicator. In addition, or separately for other faults, the first indicator 24 can transmit the appropriate code to indicate a more specific problem with the unit.

Figure 7A:
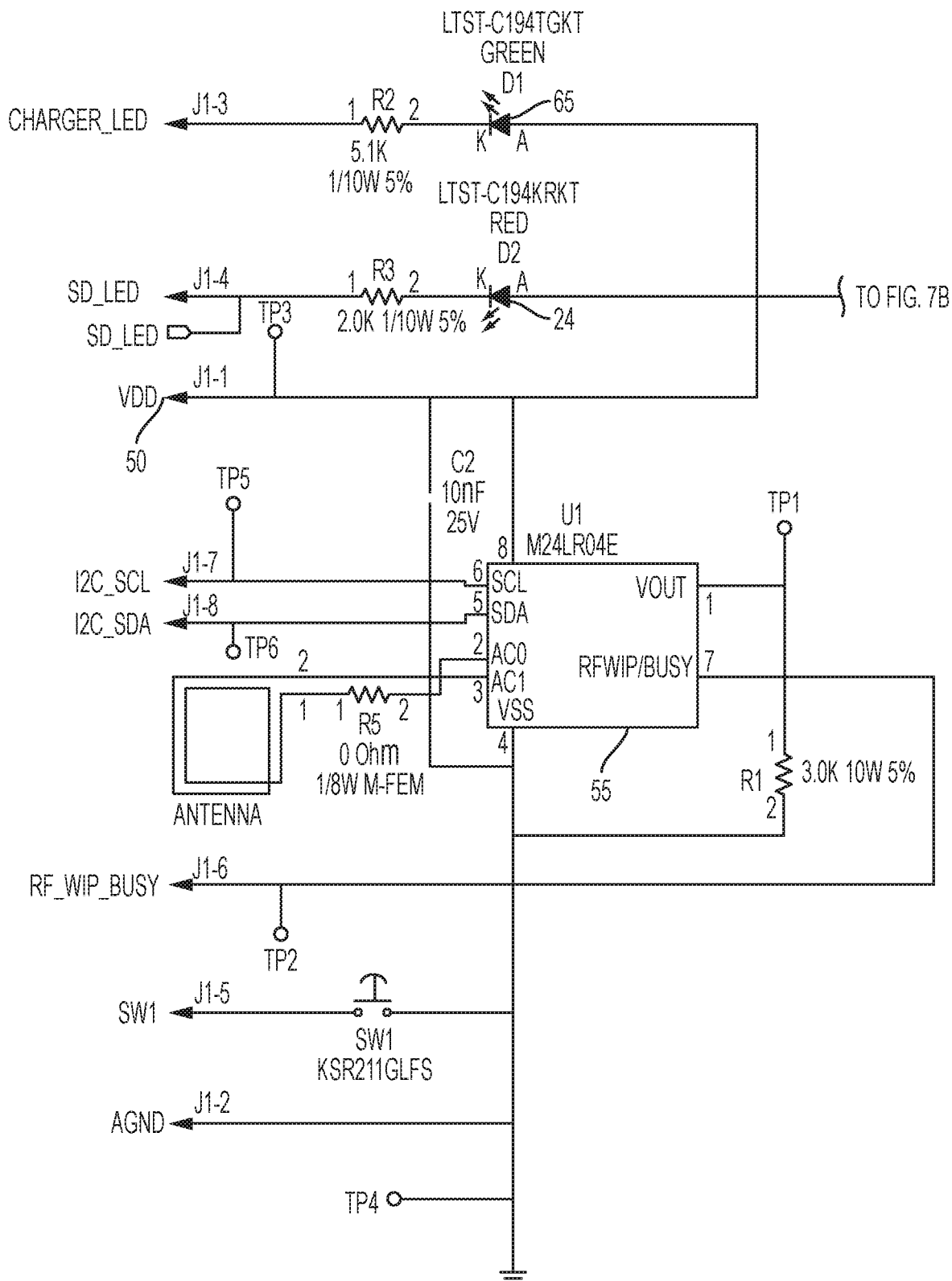
FIGS. 7A and 7B are an exemplary circuit diagram of the light unit and fault indication system.
Figure 7B:
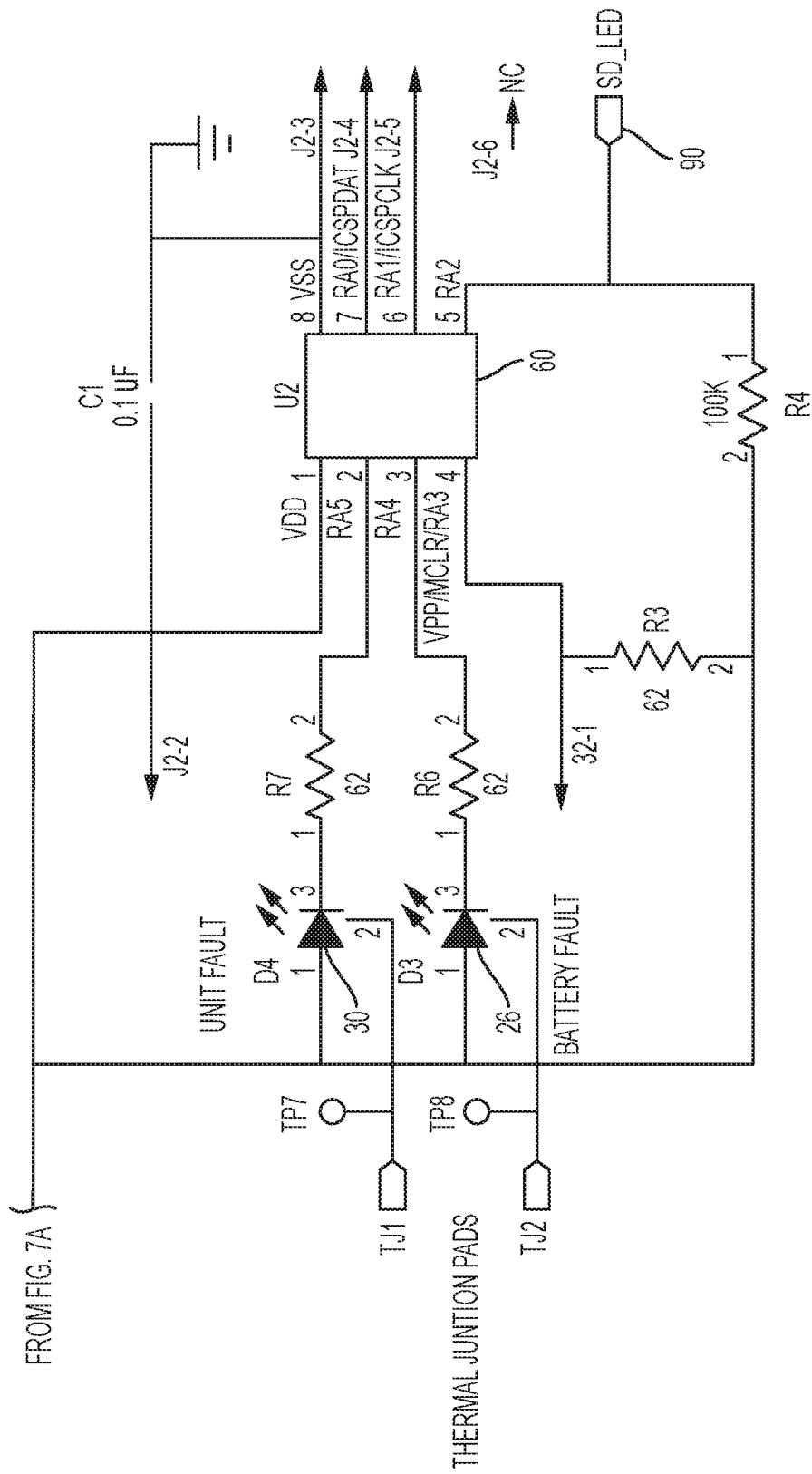

FIGS. 7A and 7B show an exemplary circuit schematic for the fault indicator circuit board. The emergency exit light device to includes, among other things, a voltage input 50, a first controller 55, a second controller 60, a charger LED 65, the first indicator light 24, the second indicator light 26, and the third indicator light 30. A nominal voltage may be received at the voltage input 50 and supplied to various components of the emergency exit light device 10.

The first controller 55 is electrically and/or communicatively connected to a variety of modules or components of the emergency exit light device 10. For example, the first controller 55 is connected to the second controller 60, the charger LED 65, the first indicator light 24, and antenna 85. The first controller 55 includes combinations of hardware and software that are operable to, among other things, monitor and/or control the operation of the emergency exit light device 10.

In some embodiments, the controller 55 is electrically and/or communication connected to one or more sensors sensing one or more characteristics of the device. In one embodiment, the sensors are temperature sensors configured to sense one or more temperatures of the device (for example, a temperature within housing 12, an ambient temperature external housing 12, a battery temperature, etc.). In other embodiments, the sensor may be electrical sensors configured to monitor one or more electrical characteristics. For example, the sensor may monitor an electrical characteristic (for example, voltage, current, power, etc.) of one or more components of the device 10 (for example, the battery, the indicators, the light emitters, the mains voltage input to device 10, etc.).

In some embodiments, the first controller 55 includes a plurality of electrical and electronic components that provide power, operation control, and protection to the components and modules within the first controller 55 and the emergency exit light device 10. For example, the first controller 55 includes, among other things, a processing unit and a memory. In some embodiments, the first controller 55 is implemented partially or entirely on a semiconductor (e.g., a field-programmable gate array ["FPGA"] semiconductor) chip, such as a chip developed through a register transfer level ("RTL") design process.

The memory includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit is connected to the memory and executes software instructions that are capable of being stored in a RAM of the memory (e.g., during execution), a ROM of the memory (e.g., on a generally permanent basis), or another non-transitory computer readable medium such as another memory or a disc. Software included in the implementation of the emergency exit light device to can be stored in the memory of the first controller 55. The software includes, for example, firmware, one or more applications, program data, filters, rules, one or more program modules, and other executable instructions. The first controller 55 is configured to retrieve from memory and execute, among other things, instructions related to the control processes and methods described herein. In other constructions, the first controller 55 includes additional, fewer, or different components.

In operation, the first controller 55 monitors one or more characteristics of the emergency exit light device to and controls operation of the charger LED 65 and the first indicator light 24, based on the monitored characteristics. For example, when a fault is detected by the first controller 55, the first controller 55 activates the first indicator light 24 accordingly. In some embodiments, the first indicator light 24 is activated corresponding to a fault code. In such an embodiment, a flash rate (for example, one flash per predetermined time period, two flashes per predetermined time period, etc.) may be used to indicate the type of fault (for example, unit has failed, battery has failed, etc.).

In some embodiments, the second controller 60 is substantially similar to the first controller 55. In some embodiments, the second controller 60 is a PIC16 microcontroller. The second controller 60 is also electrically and/or communicatively connected to a variety of modules or components of the emergency exit light device 10. For example, the second controller 60 is connected to the third indicator light 30, the second indicator light 26, and a self-diagnostic input 90.

The self-diagnostic input 90 receives a self-diagnostic signal corresponding to activation of the first indicator light 24. In operation, when the self-diagnostic signal is received, the second controller 60 interprets the self-diagnostic signal. In some embodiments, interpreting the self-diagnostic signal may include counting the amount of flashes of the first indicator light 24 that occur within the predetermined time period. The second controller 60 activates the third indicator light 30 and/or the battery fault LED 70 according to the interpreted self-diagnostic signal.

Figure 8:
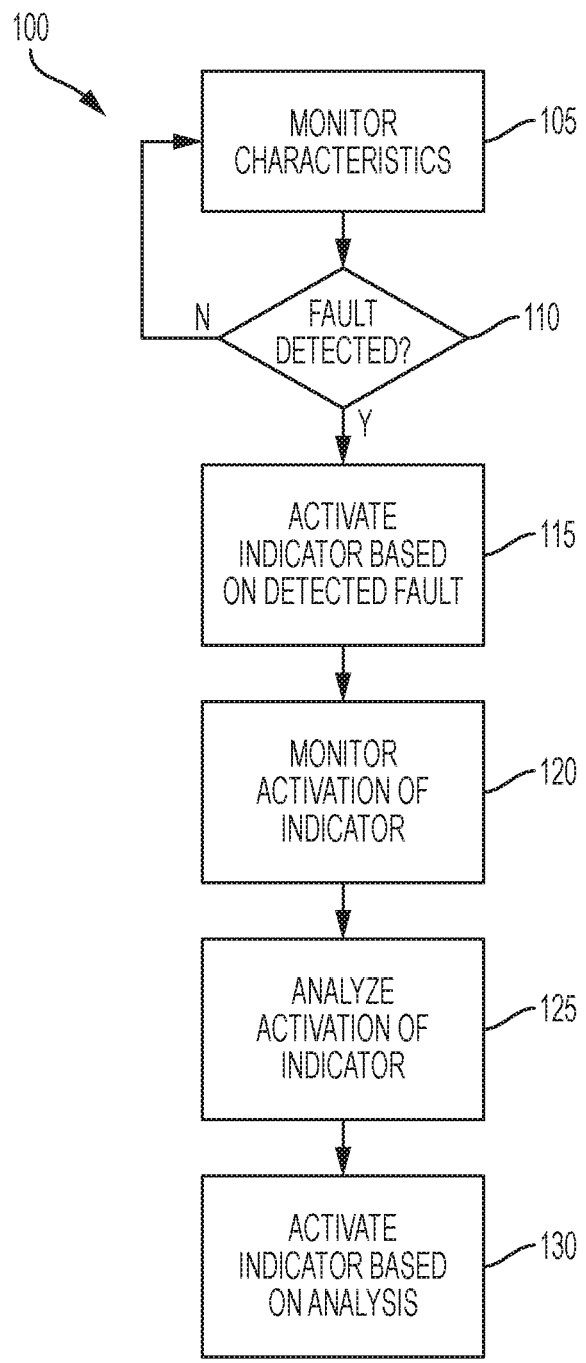
FIG. 8 is a flow chart illustrating an exemplary method of the lighting unit and fault indication system.

FIG. 8 is a flow chart illustrating a process, or operation, too according to some embodiments. It should be understood that the order of the steps disclosed in process 500 could vary. Furthermore, additional steps may be added to the process and not all of the steps may be required. Process too begins by monitoring one or more characteristics of device to (block 105). A determination is made whether there is a fault based on the monitored characteristics (block 110). If a fault is not determined, process too cycles back to block 105.

If a fault is determined, charger LED 65 and/or first indicator light 24 are controlled based on the determined fault (block 115). For example, fault indicator light 24 may be activated (for example, activated according to a flash rate) corresponding to a fault code.

The activation (for example, flash rate) of charger LED 65 and/or first indicator light 24 is monitored (block 120). The activation is analyzed (block 125). The third indicator light 300 and/or battery fault LED 70 is activated based on the analysis of block 125 (block 130).

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present invention, and are not intended to limit the structure of the exemplary embodiments of the present invention to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

The invention claimed is:

1. An emergency lighting device comprising:
   a housing;
   a light emitter positioned in the housing;
   a control circuit positioned in the housing and operatively connected to the light emitter;
   a fault indicator circuit positioned in the housing and operatively connected to the control circuit;
   a first indicator light connected to the fault indicator circuit;
   a second indicator light connected to the fault indicator circuit; and
   a third indicator light connected to the fault indicator circuit,
   wherein the fault indicator circuit is configured to activate the first indicator light to indicate a plurality of faults, to activate the second indicator light to indicate a first fault, and to activate the third indicator light to indicate a second fault, and
   wherein the first fault is different from the second fault, and at least one of the plurality of faults is different from the first fault and the second fault.

2. The emergency lighting device of claim 1, wherein the first fault is a replace battery fault.

3. The emergency lighting device of claim 1, wherein the second fault is a replace unit fault.

4. The emergency lighting device of claim 1, further comprising a diffuser positioned over the second and third indicator lights.

5. The emergency lighting device of claim 4, wherein the diffuser includes a first symbol indicating the first fault and a second symbol indicating the second fault.

6. The emergency lighting device of claim 1, wherein the first indicator is a bi-color LED.

7. The emergency lighting device of claim 1, wherein the fault indicator circuit includes a first controller and a second controller.

8. The emergency lighting device of claim 1, wherein the fault indicator circuit is configured to
   monitor the light emitter,
   analyze activation of the light emitter, and
   activate at least one of the indicator lights based on the analysis of the activation of the light emitter.

9. The emergency lighting device of claim 8, wherein activation of the light emitter includes a flash rate.

10. The emergency lighting device of claim 9, wherein the flash rate includes one or more flashes per predetermined time period.

11. The emergency lighting device of claim 8, wherein the light emitter is activated based on a characteristic monitored by the control circuit.

12. The emergency lighting device of claim 11, wherein the control circuit determines a fault based on the characteristic monitored by the control circuit.

13. The emergency lighting device of claim 12, wherein the fault is a battery fault.

14. The emergency lighting device of claim 12, wherein the fault is a unit fault.

15. An emergency lighting device comprising:
a housing;
a light emitter rotatably connected to the housing;
a control circuit positioned in the housing and operatively connected to the light emitter;
a fault indicator circuit positioned in the housing and operatively connected to the control circuit;
a backup battery positioned in the housing and operatively connected to the control circuit and the light emitter;
a first indicator light connected to the fault indicator circuit;
a second indicator light connected to the fault indicator circuit; and
a third indicator light connected to the fault indicator circuit,
wherein the fault indicator circuit is configured to activate the first indicator light to indicate a plurality of faults, to activate the second indicator light to indicate a first fault, and to activate the third indicator light to indicate a second fault, and
wherein the first fault is different from the second fault, and at least one of the plurality of faults is different from the first fault and the second fault.

16. The emergency lighting device of claim 15, wherein the control circuit is configured discharge the battery to power the light emitter.

17. The emergency lighting device of claim 15, wherein the control circuit is configured to charge the battery.

18. The emergency lighting device of claim 15, wherein the housing includes a tapered opening aligned with one of the indicator lights.

19. The emergency lighting device of claim 15, further comprising a diffuser positioned over at least one of the indicator lights, wherein the diffuser includes a symbol indicating a fault.

20. The emergency lighting device of claim 15, wherein the housing includes a front wall and a bottom wall, and wherein the light emitter extends through the front wall and at least one of the indicator lights extends through the bottom wall.

* * * * *